Patented July 19, 1932                                              1,867,864

UNITED STATES PATENT OFFICE

WILHELM NEELMEIER AND OTTO GOLL, OF LEVERKUSEN-ON-THE-RHINE, GERMANY, ASSIGNORS TO GENERAL ANILINE WORKS, INC., OF NEW YORK, N. Y., A CORPORATION OF DELAWARE

CARBAZOLE-2.7-DISULPHONIC ACID

No Drawing. Application filed May 19, 1931, Serial No. 538,632, and in Germany May 21, 1930.

The present invention relates to a new carbazole-sulphonic acid, more particularly it relates to the carbazole-2.7-disulphonic acid of the formula:

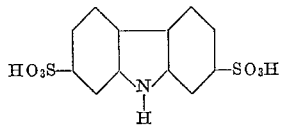

It is known that carbazoles can be produced from 2.2'-diaminodiphenyl derivatives by heating with mineral acids.

When this method is applied to 2.2'-diaminodiphenyl-4.4'-disulphonic acid, the expected carbazole-disulphonic acid is not obtained, but carbazole is produced with splitting off of the sulphonic acid groups. Even on heating with water to 180° C. a splitting off of the sulphonic acid groups likewise takes place with the formation of carbazole.

Now we have found that the carbazole-2.7-disulphonic acid can be produced from the 2.2' - diaminodiphenyl-4.4' - disulphonic acid by heating the latter at a temperature between about 170 and 200° C. in the presence of water with the addition of water soluble suitable salts or of approximately as much alkali as is required for neutralizing one sulphonic acid group of the 2.2'-diaminodiphenyl-4.4'-disulphonic acid. As suitable salts there come into consideration such ones as do not exert a secondary reaction upon the starting material or the carbazole-disulphonic acid formed, that means, salts which do not cause oxidation, nitration and the like; suitable salts are for example, sodium sulphate, sodium carbonate, ammonium sulphate and ammonium chloride.

The new carbazole-2.7-disulphonic acid is a crystalline, colorless substance, soluble in water and is a valuable intermediate product for the manufacture of dyestuffs.

The invention is illustrated by the following examples, without being limited thereto:

*Example 1*.—327 parts by weight of 2.2'-diaminodiphenyl-4.4'-disulphonic acid are heated to about 180° C. with 1500 parts of water and 40 parts by weight of caustic soda until the diamino compound has disappeared. By the addition of sodium chloride the salt of carbazole-2.7-disulphonic acid is precipitated from the cooled solution in the form of fine needles. The sodium salt is very readily soluble in hot water.

The 2.2'-diaminodiphenyl-4.4'-disulphonic acid serving as the starting material is obtained by reduction from the 2.2'-dinitrodiphenyl-4.4'-disulphonic acid, the preparation of which is described in the British Patent No. 1766/01. It is sparingly soluble in cold water and forms a sparingly soluble tetrazo compound.

*Example 2*.—327 parts by weight of 2.2'-diaminodiphenyl-4.4'-disulphonic acid are heated during 15 hours to 180° C. together with 1000 parts by weight of water and 250 parts by weight of ammonium sulphate. The hot solution is diluted with 1000 parts by weight of water and rendered slightly alkaline by means of caustic soda lye. By the addition of sodium chloride the salt of the carbazole-2.7-disulphonic acid is precipitated.

We claim:

As a new product the carbazole-2.7-disulphonic acid of the formula:

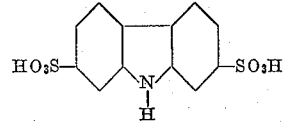

being a crystalline, colorless substance, soluble in water and being a valuable intermediate product for the manufacture of dyestuffs.

In testimony whereof we affix our signatures.

WILHELM NEELMEIER.
OTTO GOLL.